United States Patent [19]
Watanabe et al.

[11] Patent Number: 5,521,917
[45] Date of Patent: May 28, 1996

[54] ASYNCHRONOUS TRANSFER MODE SWITCHING SYSTEM CAPABLE OF REDUCING CAPACITY OF MANAGEMENT TABLE

[75] Inventors: Hiroyuki Watanabe; Hiroaki Sato, both of Tokyo, Japan

[73] Assignee: NEC Corporation, Tokyo, Japan

[21] Appl. No.: 397,971

[22] Filed: Mar. 3, 1995

[30] Foreign Application Priority Data

Mar. 3, 1994 [JP] Japan .................................. 6-033790

[51] Int. Cl.⁶ ................................................. H04L 12/56
[52] U.S. Cl. .......................... 370/1; 370/94.1; 370/110.1
[58] Field of Search ................................... 370/60.1, 94.2, 370/110.1, 58.2, 60, 94.1

[56] References Cited

U.S. PATENT DOCUMENTS

| | | | |
|---|---|---|---|
| 5,067,123 | 11/1991 | Hyodo et al. ............................... | 370/60 |
| 5,390,184 | 2/1995 | Morris ....................................... | 370/60 |
| 5,394,397 | 2/1995 | Yanagi et al. ........................... | 370/60.1 |
| 5,432,777 | 7/1995 | Le Boudec et al. ...................... | 370/60 |
| 5,440,547 | 8/1995 | Easki et al. .............................. | 370/60.1 |

OTHER PUBLICATIONS

"Introduction To B–ISDN", published by the Japan ITU Foundation, vol. 1, 1992, pp. 130–131.

*Primary Examiner*—Hassan Kizou
*Assistant Examiner*—Seema S. Rao
*Attorney, Agent, or Firm*—Sughrue, Mion, Zinn, Macpeak & Seas

[57] ABSTRACT

In an ATM (asynchronous transfer mode) switching system, a memory capacity of an ATM switch control information management table is reduced without any limitation in values of VPI and VCI even when a total number of these VPI and VCI is restricted. In this ATM switching system, a resource management unit 12 announces resource hunt information containing the VPI and the VCI to a call control unit, and further hunts a connection ID (identification) number via a switch control unit from a connection ID management table during a call-originating resource hunting operation. When the call control unit requests the switch control unit 13 to make a connection of an ATM switch at a call-originating side, or a call-terminating side, the call control unit designates this connection ID number together with these VPI and VCI. The switch control unit sets control information containing the VPI and the VCI to an ATM switch control information management table while using this connection ID number as key information, whereby this switch control unit controls the path connection of the ATM switch. As a result, the ATM switch control information management table may require such a memory capacity equal only to a value for allowing the path connections, but not equal to the maximum values of these VPI and VCI.

2 Claims, 5 Drawing Sheets

ASYNCHRONOUS TRANSFER MODE SWITCHING SYSTEM CAPABLE OF REDUCING CAPACITY OF MANAGEMENT TABLE

BACKGROUND OF THE INVENTION

1. Field of the Invention

The present invention generally relates to an ATM (asynchronous transfer mode) switching system. More specifically, the present invention is directed to such an ATM switching system for managing control information on an ATM switch for switching cells with employment of a virtual path identifier (VPI) and a virtual channel identifier (VCI).

2. Description of the Related Art

The aforementioned conventional ATM switching system is mainly arranged by, as represented in FIG. 1, the ATM switch 20 for switching the cells and the CPU (central processing unit) 30 for controlling this ATM switch 20 under software control. In this ATM switching system, the call control unit 31 of the CPU 30 analyzes the signaling information such as call setting and call releasing issued from the subscribers (terminals) 41 and 42, or another switching system (not shown), and then the resource managing unit 32 allocates and releases the resources for the call, e.g., the virtual paths (VP), the virtual channels (VC) and bands provided on the input side and the output side based on the analytical results obtained from the call control unit 31. Under control of the call control unit 31, the switch control unit 33 controls the ATM switch 20 based on the resource information to set, change and release the connections. At this time, the switch control unit 33 registers various sorts of control information used to control the ATM switch 20 into the ATM switch control information management tables (will be abbreviated as "management tables" hereinafter) 34 and 35 for management purposes. The management tables 34 and 35 own such hierarchial structures that are retrievable based upon the numbers of the designated virtual path and virtual channel, namely the values of these VPI and VCI (will also be called as "routing bits" altogether).

The respective cells for transporting the transfer information (i.e., user information) between the subscribers 41 and 42 are entered into the switching system by setting the VPI and VPC to the header, which have been designated when the connection is established. In this switching system, the management tables 34 and 35 are retrieved based on these VPI and VCI so as to acquire the route number of the ATM switch 20 on the output side, and also the necessary control information of the VPI and VCI, the header of the cell is rewritten based on those control information for the cell switching.

Since the management tables used to store the control information about the ATM switch may be directly retrieved based on the values (routing bit values) of the VPI and VCI in the switch control information managing method of the above-described conventional ATM switching system, the management tables with a large memory capacity capable of storing therein the maximum routing bits of these VPI and VCI should be prepared. For instance, in case of the Broadband ISDN (integrated services digital network), since 12 (otherwise 8) bits (routing bit) are allocated to the VPI and 16 bits are allocated to the VCI, the resultant entry size of the management table requires $2^{28}$. This may cause an economical problem. To avoid such a problem, it is conceivable to establish a limitation in the actually used numbers of VPI and VCI, namely the actually used bit numbers, as a result of negotiations with the user. For example, when four sets of VPIs and 1000 sets of VCIs are employed, the routing bits of 2 and 10 may be allocated thereto. However, because the use bit positions at this time are allocated from the least significant bits (LSB) with respect to both of these VPI and VCI, taking account of continuities of the values used to retrieve the management table, arbitrary values within the bit numbers (12, 16) in the respective specifications cannot be set (see Japanese Publication "INTRODUCTION TO B-ISDN" published by the Japan ITU Foundation, Volume 1, 1992, pages 130 to 131, Section 5.1 [2] (a) Routing Bits (VPI, VCI), and pages 140 to 141, Section 5.3 [3] (c) Routing Field (VPI, VCI).

Accordingly, an object of the present invention is to provide an ATM switching system capable of reducing a storage capacity of a management table for storing control information on an ATM switch without restricting bit values of VPI and VCI, even when there is a limitation in quantities of these VPI and VCI used to designate a cell transfer route.

SUMMARY OF THE INVENTION

To achieve the above-described object, an ATM (asynchronous transfer mode) switch for switching a cell transferred in an asynchronous transfer mode, according to one aspect of the present invention, is comprised of:

an ATM switch control information management table retrieved by a designated connection identification number, for registering therein control information used to control a path connection of said ATM switch; and switch control means for establishing corresponding relationships between connection identification numbers which are mutually discriminatable with respective path connections of said ATM switch, for forming said control information containing a virtual path identifier and a virtual channel identifier while employing said connection identification number as key information to register the formed control information into said ATM switch control information management table, and for controlling the path connection of said ATM switch, whereby the path connection of said ATM switch is controlled based upon said virtual path identifier and said virtual channel identifier.

An ATM (asychronous transfer mode) switch for switching a cell transferred in an asynchronous transfer mode, according to another aspect of the present invention, further comprises:

a connection identifier number management table for registering therein the use state information indicating whether or not each of said connection identification numbers is used to establish the corresponding relationship with the path connection of said ATM switch;

said switch control means designates any one of said connection identification numbers whose value of said use state information is unused while referring to said connection identification number management table when the path connection of said ATM switch is commenced, and also changes said use state information as a value indicative of under use;

when there is another path connection related to said path connection, the corresponding control information is added to said ATM switch control information management table with employment of said designated connection identification number; and when all of the mutually related path connections are released, the use state information of said corresponding connection identification number of said connection identifier number management table is set to a value indicative of a nonuse.

BRIEF DESCRIPTION OF THE DRAWINGS

The present invention will be described in further detail with reference to the accompanying drawings, in which.

DETAILED DESCRIPTION OF THE PREFERRED EMBODIMENTS

Referring now to drawings, an ATM (asynchronous transfer mode) switching system according to the present invention will be described in detail.

Figure 1:
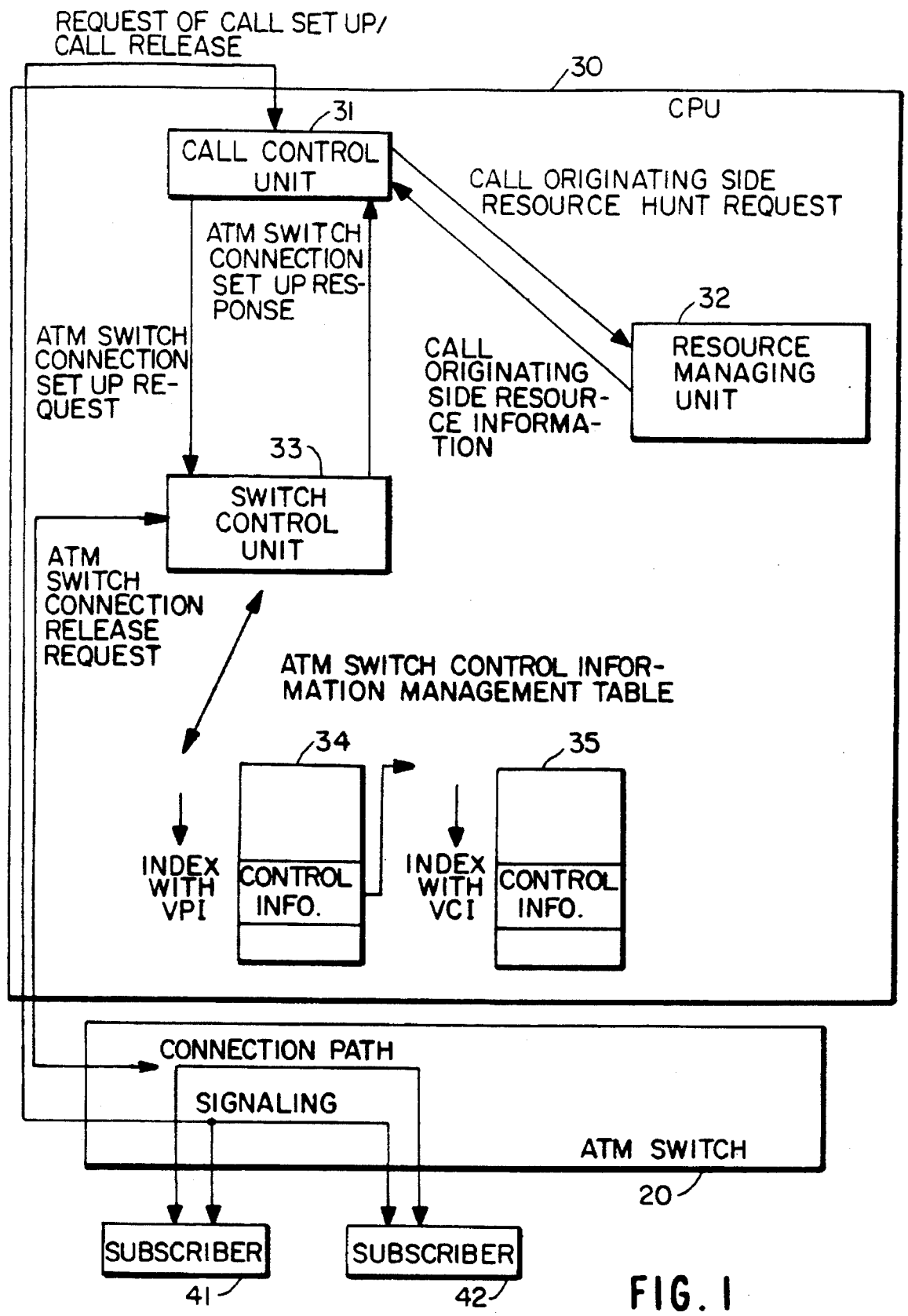
FIG. 1 is a schematic block diagram for representing the switch control information management system used in the conventional ATM switching system.
Figure 2:
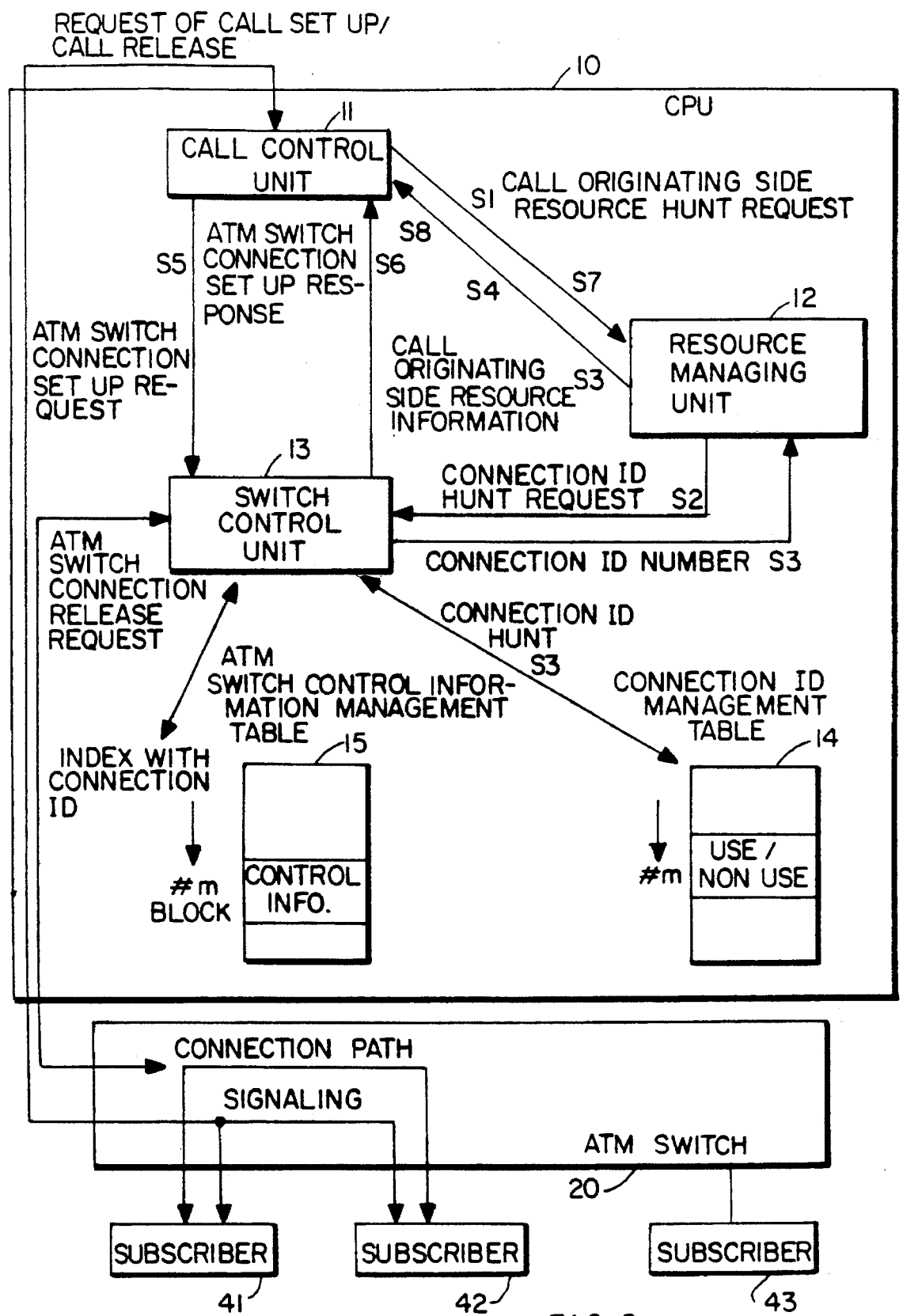
FIG. 2 is a schematic block diagram for illustrating a switch control information management system employed in an ATM switching system according to an embodiment of the present invention.

In FIG. 2, there is schematically shown an ATM switching system (output buffer type ATM switch) according to an embodiment of the present invention. It should be noted that only the system arrangements constituting the features of the present invention are represented in FIG. 2. That is, the switching system according to this embodiment is mainly constructed of an ATM switch 20 for accommodating therein a plurality of subscribers (terminals) 41 to 43 and for performing a physical path connection for cell switching between an input terminal and an output terminal, and a CPU (central processing unit) 10 operated under control of a software for controlling the overall ATM switching system involving the above-described ATM switch 20.

The CPU 10 includes a connection ID management table 14 for registering therein use/unuse conditions about a serial number (will be referred to a "connection ID number" hereinafter) which is given in connection with a single path connection of the ATM switch 20 and is used to identify the path connection, and an ATM switch control information management table 15 for registering therein various sorts of control information corresponding to the path connections of the ATM switch 20 retrieved based on the connection ID number. This CPU 10 further contains a call control unit 11 for performing such a call control as a call connection and a call disconnection based upon the signaling information issued from the subscribers 41 to 43, a resource management unit 12 for managing such resources as VPI, VCI, and band to establish the path connection of the ATM switch 20, and also a switch control unit 13. This switch control unit 13 manages the retrievals and the information registering operations of the connection ID management table 14 and the ATM switch control information table 15 in response to the resource information issued from the resource management unit 12 under control of the call control unit 11, whereby the path connections of the ATM switch 20 are controlled.

It should be noted in this embodiment that a total number of "connection ID number" may be selected to be equal only to the allowable values for the path connections of the ATM switch 20, and these allowable values are such serial numbers from "0" to values successively added by "1" (Note: positive integers). Also, the connection ID management table 14 may have a storage capacity of 1 bit for respective connection ID number to be used for discriminating whether the connection ID number is under use (value=1) or nonuse (value=0).

The control information managed in the ATM switch control information management table 15 is employed in this embodiment as follows:

(1) Switch connection state information

FW (forward), BW (backward), BOTH (both ways).

(2) Connection format information point-to-point connection, broadcasting connection.

(3) Home side demand information switch connection, FW, BW, BOTH, VPI, VCI, storage position.

(4) Mate side demand information switch connection, FW, BW, BOTH, VPI, VCI, storage position.

(5) Connection ID number parent connection ID number during broadcast connection.

A description will now be made of an operation of the above-described ATM switching system according to this embodiment of the present invention.

Referring first to a sequence diagram shown in FIG. 3 and to the system arrangement of FIG. 2, operations during the point-to-point connection will now be explained.

Figure 3:
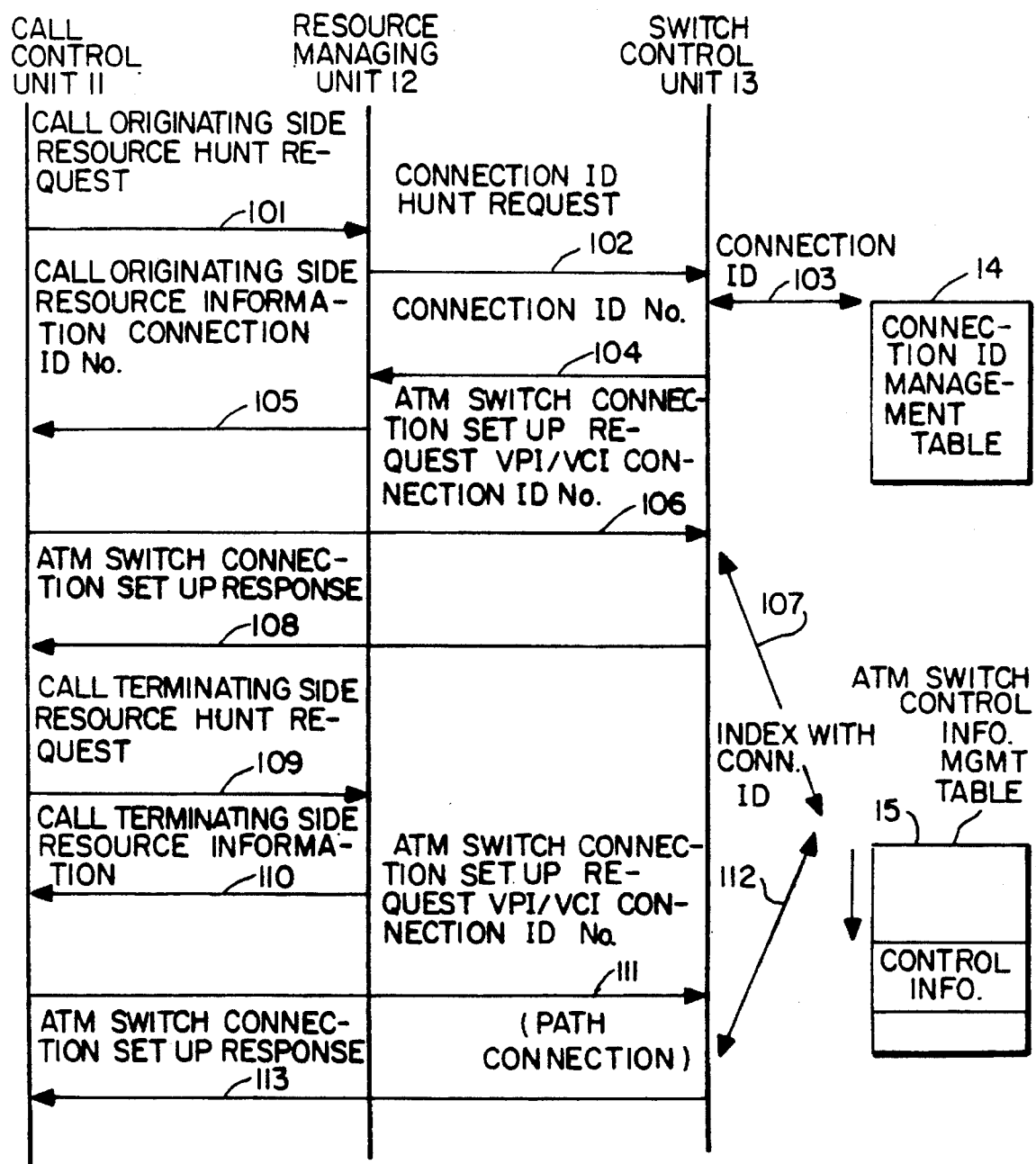
FIG. 3 schematically indicates an operation sequence during a point-to-point connection in the ATM switching system shown in FIG. 2.

Upon receipt of the signaling information for requesting a call setting up operation by the subscriber 41 to the subscriber 42, the call control unit 11 requests the resource management unit 12 to issue a resource hunt demand signal S1 in response to an analytic result of this signaling information (step 101 of sequence diagram shown in FIG. 3). Then, the resource management unit 12 executes the resource hunt and also transmits a connection ID hunt demand signal S2 to the switch control unit 13 (step 102 of FIG. 3). Upon receipt of this connection ID hunt demand signal S2, the switch control unit 13 hunts an empty connection ID number (for example, "m") from the connection ID management table 14 (step 103), and returns it as a hunt connection ID number S3 to the resource management unit 12 (step 104). The resource management unit 12 announces to the call control unit 11, both of self-issued resource hunt information S4 containing VPI, VCI and the band, and the hunt connection ID number S3 announced from the switch control unit 13 (step 105). The call control unit 11 temporarily stores the information supplied from the resource management unit 12 into a call control memory at a call originating side (not shown), and further transmits an ATM switch connection demand signal S5 to the switch control unit 13 (step 106) when the connection demand at the call originating side of the ATM switch 20 is required. The ATM switch connection demand signal S5 contains the control information of the ATM switch 20, which has been formed based upon the connection ID number, the VPI and the VCI received from the resource management unit 12.

When the ATM switch connection demand signal S5 is received, the switch control unit 13 retrieves the ATM switch control information management table 15 based on the connection ID number (m), and also stores the control information into the relevant area (m-th block) of this table 15. Further, this switch control unit 13 will judge whether or not the ATM switch connection demand signal S5 issued from the counter party (call terminating party, or call originating party) with reference to home-mate switch connection information (namely, call-terminating-party demand information in case of call originating side, call-originating-party demand information in case of call terminating side) contained in the control information. Since the ATM switch connection demand signal S5 of the counter party (call terminating party, i.e., subscriber 42) has not yet been received at this stage, the switch control unit 13 does not execute the path connection control of the ATM switch 20, but transmits an ATM switch connection response signal S6 (step 108) to the call control unit 11.

Next, the call control unit 11 transmits a call-terminating resource hunt demand signal S7 to the resource management unit 12 (step 109), whereas the resource management unit 12 returns call-terminating resource hunt information S8 similar to the call-originating resource hunt information S4 to the call control unit 11 (step 110). Then, the call control unit 11 transmits to the switch control unit 13 (step 111), both of the connection ID number (m) which has been stored in the call control memory at the call originating side when the call-originating resource hunt demand is produced (step 101), and also the ATM switch connection demand signal S5 containing the control information of the ATM switch 20, which has been formed based on the VPI and the VCI involved in the call-terminating resource hunt information S8. Upon receipt of the ATM switch connection demand signal S5, the switch control unit 13 retrieves the ATM switch control information management table 15 based on the connection ID number, and stores the control information into the relevant area (m-th block) (step 112), and will judge whether or not the ATM switch connection demand signal S5 of the counter party (call originating side, i.e., subscriber 41) has been received. At this stage, since this demand signal S5 has already been received, the switch control unit 13 edits an order to the ATM switch 20 in accordance with the control information stored in this relevant area, and then transmits this edited order to the ATM switch 20, so that the ATM switch 20 performs the path connection. Then, this switch control unit 13 transmits the ATM switch connection response signal S6 to the call control unit 11 (step 113). With the above-described operations, the communication path is set between the subscriber 41 and the subscriber 42 so that the user information can be transferred by the cell.

Figure 4:
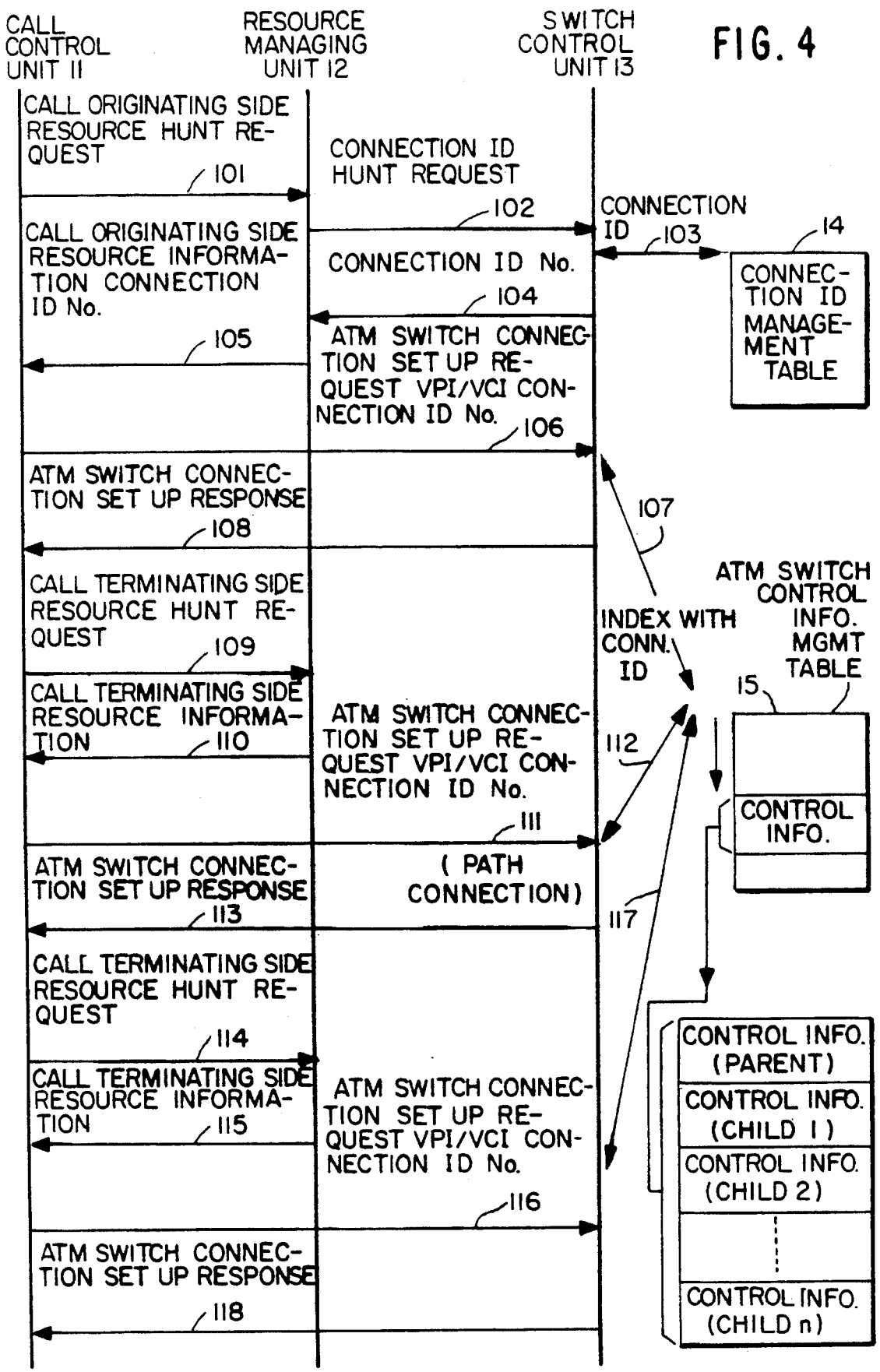
FIG. 4 schematically represents an operation sequence during a broadcasting connection in the ATM switching system shown in FIG. 2.

Subsequently, an operation of this ATM switching system during a broadcasting connection will now be described with reference to another sequence diagram of FIG. 4. In the sequence operation of FIG. 4, the sequence operations defined from the call-originating resource hunt demand (step 101) to a first person (for example, subscriber 42) among a plurality of call-terminating subscribers 42 to 43 where the subscriber 41 is recognized as the call originating side, up to the ATM switch connection response (step 113) by the call-terminating resource hunt demand (step 109) are similar to those of the above-explained point-to-point connection operation shown in FIG. 3. However, the call-originating resource hunt is not carried out with respect to any persons subsequent to a second person (subscriber 43), but only a call-terminating resource hunt is performed in a similar manner to the steps 109 to 113. In other words, the call control unit 11 requests the resource management unit 2 to execute the call-terminating resource hunt (step 114), thereby obtaining the call-terminating resource hunt information containing the VPI and the VCI (step 115). After the connection ID number (parent connection ID number) acquired when the call-originating resource hunt of the first person was performed is read out from the call control memory at the call originating side, the read connection ID number, the VPI, the VCI, and a broadcasting connection demand flag are designated to request the switch control unit 13 to connect the ATM switch 20 (step 116). When the ATM switch connection demand signal S5 is received, the switch control unit 13 retrieves the ATM switch control information management table 15 based on the connection ID number, and additionally stores the above-described control information into the relevant area (step 117). Then, the switch control unit 13 additionally connects the path of the ATM switch 20 and then announces an ATM switch additional connection response to the call control unit 11 (step 118).

Figure 5:
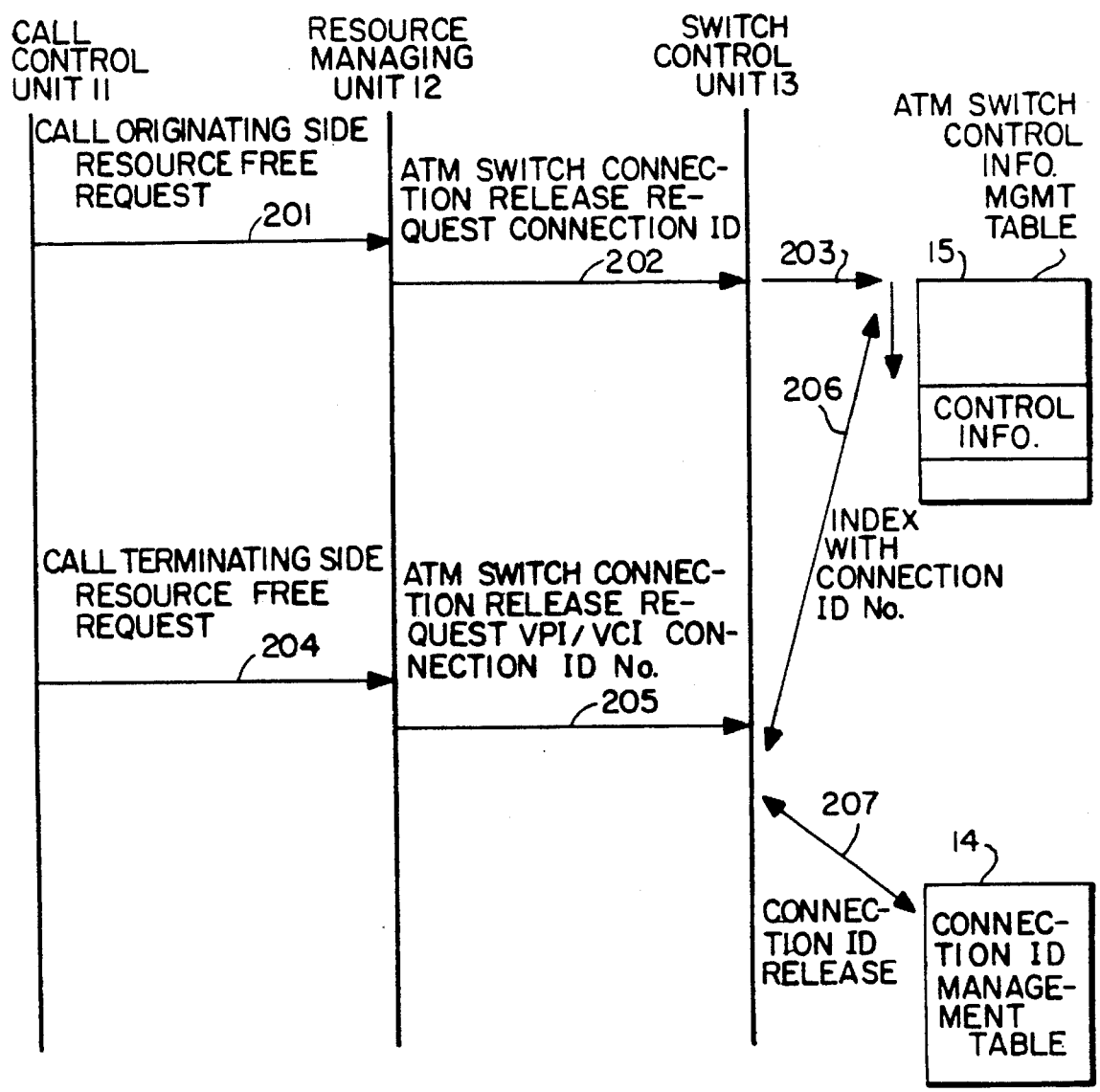
FIG. 5 schematically shows an operation sequence during a switch release in the ATM switching system shown in FIG. 2.

Next, an operation of the ATM switching system during a switch release will be explained with reference to a sequence diagram of FIG. 5. In the sequence operation of FIG. 5, when the call control unit 11 designates the connection ID number, the VPI and the VCI at the resource management unit 12 to execute a call-originating resource free demand (step 201), the resource management unit 12 announces the connection ID number to the switch control unit 13 so as to request a release of the ATM switch 20 at the call originating side (step 202). Upon receipt of the ATM switch release demand, the switch control unit 13 retrieves the ATM switch control information management table 15 based on the connection ID number to bring both of switch connection state information and call-originating demand information of the relevant area into empty states, and then sends an order to the ATM switch 20 so as to disconnect the path connection (step 203).

Subsequently, the call control unit 11 executes a call-terminating resource free demand at the resource management unit 12 (step 204), and the resource management unit 12 designates the connection ID number at the switch control unit 13 to request a release of the ATM switch 20 at the call terminating side (step 205). When the ATM switch release demand is received, the switch control unit 13 retrieves the ATM switch control information management table 15 based on the connection ID number, and brings the call-terminating demand information into an empty state (step 206) because both of the switch connection state information and the call-originating demand information are under empty state. Also, the switch control unit 13 judges whether or not all of the connected ATM switch release demands at the call originating side and the call terminating side have been received. When all of these ATM switch release demands have been received, a value indicative of a nonuse state is set to the relevant area within the connection ID management table 14, so that a free process operation of the connection ID number is carried out (step 207).

As previously described, in accordance with the ATM switching system of this embodiment, when the resource hunt demand at the call originating side, or the call terminating side transmitted from the call control unit is received, the resource management unit hunts the resource containing the VPI and VCI and then announces it as the resource hunt information at the call originating side, or the call terminating side to the call control unit, respectively. In particular, when the call-originating resource hunt demand is received, this resource management unit hunts the connection ID (identification) number with respect to the switch control unit, and also announces it together with the above-described call-originating resource hunt information to the call control unit. When the call control unit requests the switch control unit to connect the ATM switch at the call originating side, or the call terminating side, the call control unit designates the connection ID number announced during the execution of the call-originating resource hunt together with the respective VPI and VCI. Then, the switch control unit retrieves the ATM switch control information management table based on this connection ID number to set the control information containing the VPI and VCI, and further controls the path connections of the ATM switch. As a consequence, only the values to allow the path connections may be required as the memory size of the ATM switch control information management table, and the management table need not have such a large memory size required to store the maximum values of the VPI and the VCI, so that the memory capacity can be effectively utilized. As the values of the VPI and the VCI, arbitrary values may be selected within the range of the bit number defined in the specification, so that there is no limitation in the use bit position allocated from LSB. These effects of this embodiment may be achieved not only in the point-to-point connection, but also in the broadcasting connection.

As described above, the ATM switching system capable of reducing a storage capacity of a management table according to the present invention is comprised of such an ATM switch control information management table for storing therein the control information used to control the path connection of the ATM switch retrieved by the designated connection identification (ID) number. The connection identification numbers which are mutually discriminatable are previously related to the respective path connections of the ATM switch. While the connection identification number is employed as the key information, the control information containing the virtual path identifier (VPI) and the virtual channel identifier (VCI) is formed and then set to the ATM switch control information management table in order that the path connections of the ATM switch are controlled. As a consequence, the memory capacity of the ATM switch control information management table can be reduced without restricting the respective values of these VPI and VCI even when the total amounts of these VPI and VCI are limited.

In case that there is another path connection related to the once set path connection, since the firstly designated connection identification number is registered as the key information into the ATM switch control information management table for the control information used to the remaining path connections and is managed, the memory capacity of the ATM switch control information management table can be similarly reduced also in case of the broadcasting connection.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An ATM (asychronous transfer mode) switch for switching a cell transferred in an asynchronous transfer mode, comprising:

an ATM switch control information management table retrieved by a designated connection identification number, for registering therein control information used to control a path connection of said ATM switch; and switch control means for establishing corresponding relationships between connection identification numbers and respective path connections of said ATM switch, for forming said control information containing a virtual path identifier and a virtual channel identifier while employing said connection identification number as key information to register the formed control information into said ATM switch control information management table, and for controlling the path connection of said ATM switch, whereby the path connection of said ATM switch is controlled based upon said virtual path identifier and said virtual channel identifier.

2. An ATM (asychronous transfer mode) switch for switching a cell transferred in an asynchronous transfer mode as claimed in claim 1, further comprising:

a connection identifier number management table for registering therein the use state information indicating whether or not each of said connection identification numbers used to establish the path connections of said ATM switch; and said switch control means for designating any one of said connection identification numbers whose value of said use state information is unused while referring to said connection identifier number management table when the path connection of said ATM switch is commenced and changing the value of said use state information to under use, for adding control information of another path connection related to said path connection to said ATM switch control information management table with employment of said designated connection identification number, and for resetting the value of said use state information of said connection identification number of said connection identifier number management table to a nonuse when all of the mutually related path connections are released.

* * * * *

UNITED STATES PATENT AND TRADEMARK OFFICE
CERTIFICATE OF CORRECTION

PATENT NO. : 5,521,917
DATED : May 28, 1996
INVENTOR(S) : Hiroyuki WATANABE, et al.

It is certified that error appears in the above-indentified patent and that said Letters Patent is hereby corrected as shown below:

Column 8, line 51, delete "mutually".

Signed and Sealed this

Twentieth Day of August, 1996

Attest:

BRUCE LEHMAN

Attesting Officer     Commissioner of Patents and Trademarks